United States Patent
Khandpur et al.

(10) Patent No.: US 6,777,080 B2
(45) Date of Patent: Aug. 17, 2004

(54) PRESSURE SENSITIVE ADHESIVE COMPOSITION

(75) Inventors: Ashish Kumar Khandpur, Lake Elmo, MN (US); Mark David Gehlsen, Eagan, MN (US); Kenneth Jason Hanley, Eagan, MN (US); John James Stradinger, Roseville, MN (US); Patrick Jay Fischer, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 140 days.

(21) Appl. No.: 10/117,752

(22) Filed: Apr. 4, 2002

(65) Prior Publication Data

US 2003/0190468 A1 Oct. 9, 2003

(51) Int. Cl.$^7$ .............................. B32B 7/12; C08F 265/04
(52) U.S. Cl. .......................... 428/355 AC; 428/317.5; 428/317.7; 428/355 RA; 526/931; 525/309; 525/224; 525/241
(58) Field of Search ................... 526/931; 428/317.5, 428/317.7, 318.4, 355 R, 355 RA, 355 AC; 525/224, 241, 308, 309

(56) References Cited

U.S. PATENT DOCUMENTS

| | | | |
|---|---|---|---|
| 4,104,323 A | 8/1978 | Hansen | |
| 4,141,876 A | 2/1979 | Hansen | |
| 4,223,067 A | 9/1980 | Levens | |
| 4,314,926 A | 2/1982 | Allison, III | |
| 4,415,615 A | 11/1983 | Esmay et al. | |
| 4,554,324 A | * 11/1985 | Husman et al. | 525/301 |
| 4,950,537 A | 8/1990 | Vesley et al. | |
| 5,057,366 A | 10/1991 | Husman et al. | |
| 5,164,454 A | * 11/1992 | Suga et al. | 525/309 |
| 5,296,547 A | 3/1994 | Nestegard et al. | |
| H1387 H | 12/1994 | Hansen et al. | |
| 5,910,526 A | 6/1999 | Chu et al. | |
| 6,103,152 A | 8/2000 | Gehlsen et al. | |

FOREIGN PATENT DOCUMENTS

| | | |
|---|---|---|
| EP | 0 104 046 | 3/1984 |
| WO | WO 90/14397 | 11/1990 |
| WO | WO 90/14396 | 11/1999 |
| WO | WO 00/24840 | 5/2000 |
| WO | WO 00/64973 | 11/2000 |

OTHER PUBLICATIONS

David, "Making the Grade," *Adhesives Age,* (Jul. 2000), pp. 46–50.

Himes et al., "Achieving High Service Temperatures with Thermoplastic Elastomers," *Adhesives Age,* (Apr. 1997), pp. 28–32.

Ho et al., "Block Copolymer Based Pressure Sensitive Adhesives Modified with PPO for Increased Service Temperatures," *Adhesion,* vol. 73, No. 1, (2000), pp. 65–85.

\* cited by examiner

*Primary Examiner*—James J. Seidleck
*Assistant Examiner*—Thao T Tran
(74) *Attorney, Agent, or Firm*—Sean J. Edman

(57) ABSTRACT

Pressure sensitive adhesive compositions and pressure sensitive adhesive articles containing the adhesive compositions are disclosed. The adhesive compositions of the invention generally demonstrate favorable cohesive strength at elevated temperatures. The adhesive compositions contain an acrylic acid ester copolymer having pendant styrenic polymeric moieties mixed with a polyarylene oxide polymer. The adhesive composition may be a foam.

28 Claims, 3 Drawing Sheets

PRESSURE SENSITIVE ADHESIVE COMPOSITION

FIELD OF THE INVENTION

The present invention relates to adhesives, more specifically to pressure sensitive adhesives. In particular, the invention relates to pressure sensitive adhesives having favorable shear properties at elevated temperatures.

BACKGROUND

Pressure sensitive adhesive (PSA) compositions are used in a wide variety of applications, including many assembly and manufacturing applications. Numerous applications require PSAs to support a load at elevated temperatures, typically in the range of greater than 70° C., for which high cohesive strength PSAs are required. A standard method of increasing cohesive strength at elevated temperatures is to chemically crosslink the PSA using irradiation processes, such as thermal radiation, ultraviolet (UV) radiation, gamma radiation, and electron beam (EB) radiation, etc. Although these processes improve cohesive strength, they often negatively impact other properties, including peel strength of the PSA.

SUMMARY OF THE INVENTION

A need exists for an improved PSA with high cohesive strength that does not require chemical crosslinking. The present invention is directed to PSA compositions and to PSA articles containing the adhesive composition. The adhesive compositions of the invention generally demonstrate desirable cohesive strength at elevated temperatures. This cohesive strength can be at least as high as that obtained with chemical crosslinking. Thus, the adhesive composition provides many of the advantages of crosslinking without various disadvantages, such as excessive degradation of the adhesive and loss of adhesion.

The PSA compositions generally contain an organic copolymer having pendant styrenic polymeric moieties. This copolymer is mixed with a polyarylene oxide polymer to provide an adhesive having favorable cohesive strength at elevated temperatures.

In general, the copolymer contains at least an acrylic acid ester of a non-tertiary alcohol and pendant styrenic polymeric moieties. The pendant styrenic moieties are believed to endow the acrylic polymeric backbone with elevated shear strength values compared to adhesives that do not contain the styrenic moieties. The copolymer is normally produced by adding or grafting the reinforcing polymeric moieties to the soft acrylic backbone to obtain the needed shear strength. The reinforcing polymeric moieties may be grafted by, for example, polymerizing a monomer with reactive sites located on the backbone, attaching preformed polymeric moieties to sites on the backbone, or by co-polymerizing the acrylic monomer with preformed polymeric monomer.

Copolymers suitable for use with the invention include those based on acrylic acid esters of non-tertiary alcohols. The acrylic acid esters are generally formed from an alcohol having from 1 to 14 carbon atoms, with the average number of carbon atoms being about 4 to 12 in certain implementations of the invention. However, in some implementations more than 12 carbon atoms may be present on average. As used herein, acrylic acid esters include, but are not limited to, acrylic and methacrylic acid esters. In one implementation the acrylic acid esters are isooctyl acrylate or 2-ethylhexyl acrylate. The acrylic acid esters can also optionally be copolymerized with a polar monomer to form a polymeric backbone. Suitable polar monomers include, without limitation, acrylic acid, methacrylic acid, itaconic acid, acrylamide, methacrylamide, acrylonitrile, methacrylonitrile, and combinations thereof.

The pendant styrenic polymeric moieties provide improvements in the shear strength of the PSA, and typically comprise polystyrene although other styrenic moieties may be used. For example, the pendant (graft) styrenic polymeric moieties may comprise (meth)acrylate-terminated polystyrene. In certain embodiments the pendant styrenic polymeric moieties have a molecular weight in the range of 2,000 to 30,000. Also, in some implementations the pendant styrenic polymeric moieties comprise from 1 to 30 weight percent of the total monomers of said copolymer, although amounts outside of this range are also possible.

The polyarylene oxide polymer provides improvements in the high-temperature performance of the adhesive composition. Generally the polyarylene oxide polymer comprises polyphenylene ether. For example, the polyarylene oxide polymer can include poly(2,6-dimethyl-1,4-phenylene ether). Typically the polyarylene oxide polymer has a glass transition temperature ($T_g$) of at least 100° C., more typically of at least 120° C., and even more typically of at least 140° C. The polyarylene oxide polymer used in the PSA typically has a $T_g$ that is at least about 20° C. higher than that of the polymeric styrenic moieties of the acrylic copolymer. Surprisingly, it was found that in some embodiments, both peel and shear performance increased with increasing amounts of polyarylene oxide.

The polyarylene oxide generally has high thermodynamic selectivity for styrenic portions of the graft copolymer, resulting in an adhesive that demonstrates many of the desirable properties of a chemically crosslinked adhesive but with more versatility. In this manner, the ingredients of the adhesive are essentially "physically" or "structurally" crosslinked by the aggregation of the styrenic moieties, without being covalently crosslinked. This physical or structural crosslinking is believed to be created by formation of a network of micro-phase separated domains formed by the hard styrenic blocks being swollen by the polyarylene oxide. The microphase-separated domains may have lamellar, spherical, cylindrical, micellar, co-continuous, or other morphologies.

The polymeric mixture comprising polyarylene oxide is generally suitable for use as an adhesive composition at elevated temperatures even without being chemically crosslinked. Thus, in most implementations, the polymeric mixture does not contain a chemical crosslinker and/or is not subjected to processes causing chemical crosslinking of the adhesive. However, in some implementations, the shear performance of the adhesive compositions of the present invention can be augmented by subjecting them to irradiation (e.g., actinic radiation, such as ultra-violet and thermal, and electron beam) or adding a chemical crosslinker, either of which can cause chemical crosslinking (i.e., covalent bonds).

In some preferred embodiments, the composition is not substantially chemically crosslinked. This can be shown, for example, by the gel content of the adhesive composition. In most implementations the adhesive composition has a gel content of about zero. The gel content is preferably less than 25 percent of the crosslinkable material, more preferably less than 10 percent, and most preferably less than 2 percent.

In other aspects, the invention is directed to a PSA composition comprising a graft copolymer having at least first and second monomers, wherein the first monomer is a monomeric acrylic or methacrylic acid ester of a non-tertiary alcohol, said alcohol having from 1 to 14 carbon atoms, with the average number of carbon atoms being about 4–12. The second monomer has the general formula X—(Y)$_n$—Z, wherein: X is a vinyl group copolymerizable with said first monomer; Y is a divalent linking group; where n can be zero or 1; Z is a monovalent styrenic polymeric moiety having a molecular weight in the range of about 2,000 to 30,000 and being essentially unreactive under copolymerization conditions. Optionally, a third monomer, a polar monomer such as acrylic acid, is included in the copolymer. The composition further includes at least some polyarylene oxide polymer. Various other materials, including polymers and monomers, may be incorporated into the composition.

In certain embodiments the PSA is formed into a foam that is characterized by a density lower than the density of the bulk PSA composition itself. Density reduction can be achieved in a number of ways, including, for example, through creation of gas-filled voids in the matrix (e.g., by means of a blowing agent) or inclusion of polymeric microspheres (e.g., expandable microspheres) or non-polymeric microspheres (e.g., glass microspheres). Embodiments that contain the expanded polymeric microspheres create a foam article with numerous voids. The interiors of the voids are preferably substantially non-adhesive, and are therefore compressible without collapsing. In this manner the foamed PSA articles can be subjected to routine pressure without excessive degradation of their foam properties.

The invention is also directed to a method of forming a PSA article, including a foamed PSA. At least one method embodiment includes providing a polymeric composition containing a copolymer as described herein and a polyarylene oxide; heating the polymeric composition to above a $T_g$ without substantially degrading the polymeric components; mixing the polymeric composition; cooling the polymeric composition to a temperature below the activation temperature of polymeric microspheres, and adding expandable polymeric microspheres to the cooled polymeric composition. The method generally further comprises heating the polymeric composition above the activation temperature of the polymeric microspheres.

Other features and advantages of the invention will be apparent from the following detailed description of the invention and the claims. The above summary of principles of the disclosure is not intended to describe each illustrated embodiment or every implementation of the present disclosure.

BRIEF DESCRIPTION OF THE FIGURES

Other aspects and advantages of the invention will become apparent upon reading the following detailed description and upon reference to the drawing in which.

Figure 1:
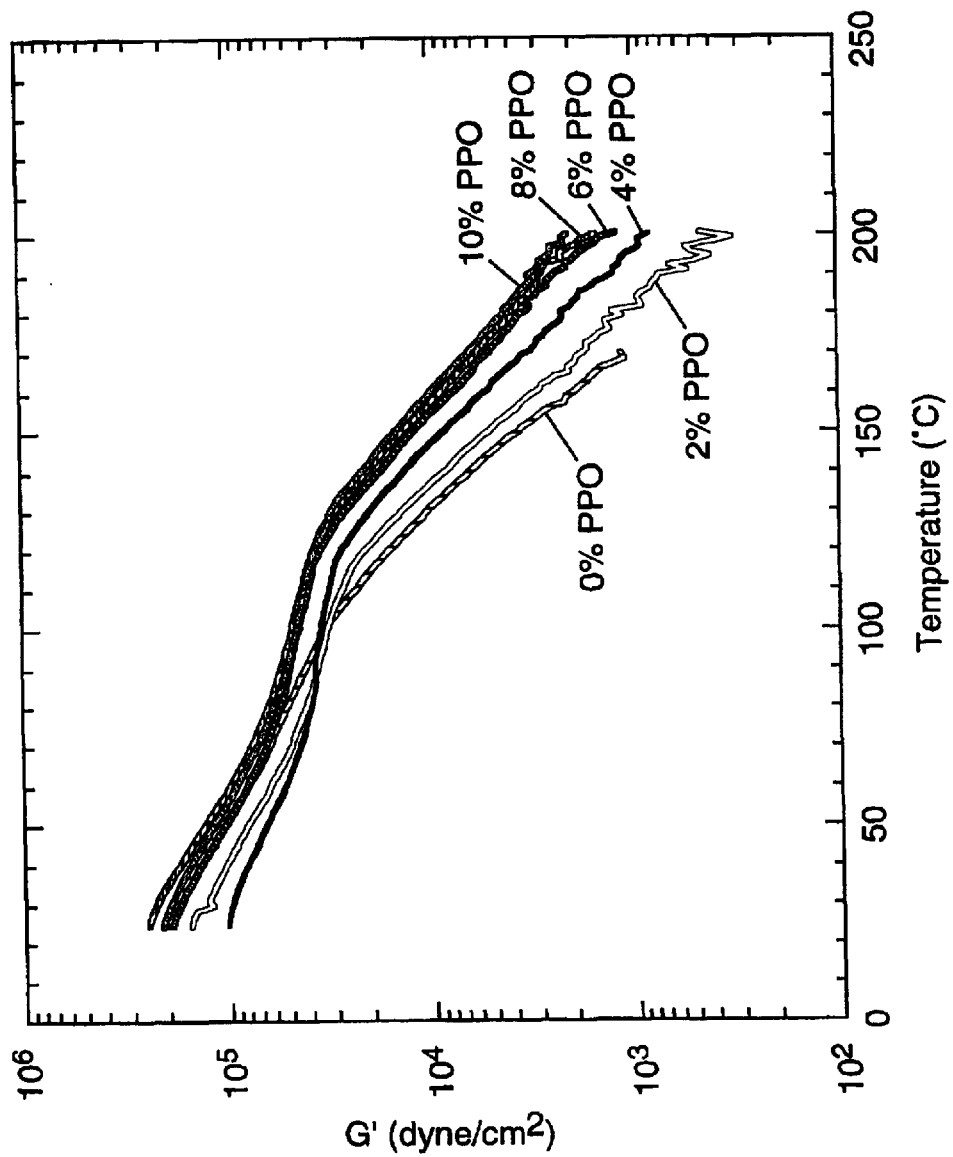
FIG. 1 is an illustration of the temperature dependence of the elastic modulus (G') for increasing concentrations of polyphenylene ether (PPO) in Isooctyl Acrylate/Acrylic Acid—derived copolymer grafted with a polystyrene-reinforcing moiety.

While the invention is susceptible to various modifications and alternative forms, specifics thereof have been shown by way of example in the figure and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to a PSA composition and to a PSA article such as a film or foam containing the adhesive composition. The adhesive composition has significant cohesive strength, especially at elevated temperatures.

The ingredients of the PSA composition, methods of making the composition, and example compositions will now be discussed in greater detail.

I. Acrylic Acid Copolymer

The pressure sensitive adhesive compositions generally contain a graft copolymer having pendant styrenic polymeric moieties. The copolymer often contains an acrylic acid ester of a non-tertiary alcohol and pendant styrenic polymeric moieties.

Various monomer acrylic acid esters can be used with the invention. In some instances, the monomeric acrylic acid ester of a non-tertiary alcohol has from 1 to 14 carbon atoms, with the average number of carbon atoms being about 4 to 12. Examples of such monomers include esters of acrylic acid or methacrylic acid with non-tertiary alkyl alcohols such as 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, 1-dodecanol. Examples of such monomers include, but are not limited to, isooctyl acrylate, 2-ethylhexyl acrylate, isononyl acrylate, 2-ethylhexyl acrylate, decyl acrylate, dodecyl acrylate, n-butyl acrylate, hexyl acrylate, and the like. Preferred monomers include isooctyl acrylate, 2-ethylhexyl acrylate, isononyl acrylate, and butyl acrylate. Many such monomeric acrylic or methacrylic esters are commercially available.

The acrylic acid ester polymer is typically copolymerizable with a material containing pendant styrenic moieties. This material has a copolymerizable vinyl group with which the acrylate polymer will copolymerize under the polymerization conditions. The copolymerizable material can be represented by the general formula X—(Y)$_n$—Z wherein X is a vinyl group copolymerizable with the acrylate polymer; Y is a divalent linking group where n can be zero or one; and Z is a monovalent styrenic polymeric moiety having a weight average molecular weight in the range of about 2,000 to 30,000 and being essentially unreactive under copolymerization conditions.

In addition to the acrylate monomer and pendant styrenic moieties, the copolymer can optionally contain a polar monomer included in the polymeric acrylic backbone. Preferred polar monomers are acrylic acid, methacrylic acid, itaconic acid, acrylamide, methacrylamide, acrylonitrile and methacrylonitrile. This polar monomer is not generally required to produce the improved pressure sensitive composition, but preferably up to 12% polar monomer of the total weight of all monomers of the copolymer backbone are be included in certain embodiments. In one such implementation, the PSA composition made according to the present invention contains from 2 to 8% by weight of this optional polar monomer of the total weight of all monomers, when such monomers are included.

The copolymer has pendant styrenic polymeric moieties that tend to reinforce the otherwise soft acrylate backbone, providing a substantial increase in the shear strength of the resultant copolymer adhesive composition. Examples of suitable styrenic polymers include those made from monomers such as styrene, its homologs and analogs, such as alpha-methyl styrene, 3-methylstyrene, vinyltoluene, ethylstyrene, t-butylstyrene, isopropylstyrene, dimethylstyrene, and vinylnapthalenes, and mixtures thereof. The amounts of these styrenic pendant moieties indicate the level at which optimization of the shear strength value is noted. An excessive quantity of the pendant moieties makes the resultant copolymer overly reinforced, decreasing its adhesive tack and making it more like a polymeric film than an adhesive composition.

II. Polyarylene Oxide Polymer

The copolymer of the invention is mixed with a polyarylene oxide polymer. Polyarylene oxide polymers useful in the present invention include those with the following repeat unit:

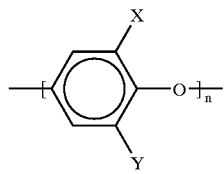

where n designates the number of repeating units, "O" is oxygen, and each "X" and "Y" is, independently, a monovalent substituent selected from the group consisting of hydrogen, halogen, primary or secondary lower alkyl (i.e., alkyl containing up to seven carbon atoms), phenyl, haloalkyl, aminoalkyl, hydrocarbon radicals, halohydrogen radicals having at least two carbon atoms between the halogen atom and the phenyl nucleus, hydrocarbonoxy radicals and halohydrocarbonoxy radicals having at least two carbon atoms between the halogen atoms and phenyl nucleus. Preferred polyarylene oxides polymers include those where "X" and "Y" are methyl groups. Specific suitable polyarylene oxide polymers include polyphenylene ethers, such as poly(2,6-dimethyl-1,4-phenylene ether). Homopolymer, copolymer, and functionalized polyarylene oxides are included.

The polyarylene oxide polymer, or resin, used in the PSA typically has a high glass transition temperature ($T_g$), usually from 100 to 230° C., preferably from 120 to 170° C., as determined by differential scanning calorimetry. The weight average molecular weight ($M_w$) typically ranges from 1,000 to 25,000 (g/mol), preferably 2,000 to 10,000 (g/mol), more preferably 4,000 to 8,000 (g/mol), as determined by gel permeation or size exclusion chromatography. The intrinsic viscosity (IV) of the polyarylene oxide polymer is most often in the range of about 0.05–0.60 dl/g, preferably about 0.08–0.20 dl/g, more preferably in the range of about 0.10–0.15 dl/g, as measured in chloroform at 25° C.

III. Polymeric Mixture

As discussed above, the polymeric mixture contains at least one copolymer, usually a graft copolymer, with polymer styrenic moieties and a polyarylene oxide polymer. Surprisingly, the randomly-located pendant styrenic moieties are able to microphase separate into domains. The polyarylene oxide is miscible with the styrenic moieties of the graft copolymer in these domains. Thus the polyarylene oxide in the styrenic domains serves to raise the $T_g$ of the domains above that of the domains formed from the styrenic moieties alone (i.e., without any polyarylene oxide). Sufficient polyarylene oxide is added to the copolymer to affect a measurable increase in the resulting $T_g$ of the styrenic component of the mixture compared to a composition of the acrylic copolymer not containing polyarylene oxide. This increase in $T_g$ results in an increase in the cohesive strength of the copolymer. Typically the weight ratio of polyarylene oxide to the styrenic moieties component of the copolymer is at least 0.05 and more preferably from 0.5 to 5.0. Actual ratios depend on the type and amount of materials in the PSA and the properties desired. The maximum use or service temperature of the resulting article tends to increase as the $T_g$ of the polyarylene oxide increases for a given amount of the polyarylene oxide in the mixture or as the ratio of polyarylene oxide to styrenic material increases.

The polymeric mixture is generally suitable for use as an adhesive composition without being additionally chemically crosslinked after formation. Thus, in most implementations the polymeric mixture does not contain a substantial amount of chemical crosslinks. It is acceptable to chemically crosslink the material in certain implementations of the invention, depending on the intended application.

By avoiding chemical crosslinking the tackiness and adhesion characteristics of the adhesive composition are more easily preserved. This absence of chemical crosslinks can be demonstrated, for example, by the gel content of the adhesive composition. In most implementations the polymeric mixture has a gel content of less than 25 percent of the crosslinkable material, preferably less than 10 percent and more preferably less than 2 percent. The gel content can be estimated by determining the fraction of a composition that becomes insoluble through crosslinking. Generally chemical crosslinks are not soluble and physical crosslinks are soluble when appropriate solvents are employed.

$$\text{Gel \%} = \frac{(w_f - w_i)}{w_s} \times 100$$

where, $w_s$=Weight of the copolymer having pendant styrenic moieties (crosslinkable mass)

$w_i$=Weight of insolubles material present before chemically crosslinking $w_f$=Final weight of sample including insolubles.

The above calculation must be corrected for material that is not crosslinkable but is also insoluble, e.g. fillers and most expandable microspheres.

It is desirable for the adhesive composition to be substantially solvent-free. That is, it is preferred that the adhesive composition contain less than 20 wt. % solvent, more preferably, contain substantially less than about 10 wt. % solvent and, even more preferably, contain less than about 5 wt. % solvent.

IV. Foamed PSA

The PSA composition can include a plurality of expandable polymeric microspheres to form a foam. The foam may also include one or more non-expandable microspheres, which may be polymeric or non-polymeric microspheres (e.g., glass microspheres). The expandable microspheres typically feature a flexible, thermoplastic, polymeric shell and a core that includes a liquid and/or gases that expands upon heating. The core material is generally an organic substance that has a lower boiling point than the $T_g$ of the polymeric shell. Examples of suitable core materials include propane, butane, pentane, isobutane, neopentane, and combinations thereof. Preferred core materials are materials other than air that expand upon heating. Microspheres suitable for use with the invention usually have an activation temperature below the temperature needed to melt mix the copolymer and the polyarylene oxide polymer. Thus, the activation temperature is generally less than 200° C., more typically less than 150° C.

The choice of thermoplastic resin for the polymeric shell of the microspheres influences the mechanical properties of the foam. Accordingly, the properties of the foam may be adjusted through appropriate choice of microsphere, or by using mixtures of different types of microspheres. For example, acrylonitrile-containing resins are useful where high tensile and cohesive strength are desired, particularly where the acrylonitrile content is at least 50% by weight of the resin, more preferably at least 60% by weight, and even more preferably at least 70% by weight. In general, both tensile and cohesive strength increase with increasing acrylonitrile content. In some cases, it is possible to prepare foams having higher tensile and cohesive strength than the polymer matrix alone, even though the foam has a lower density than the matrix. This provides the capability of preparing high strength, low density articles.

The amount of expandable microspheres is selected based upon the desired properties of the foam product. Higher microsphere concentrations generally cause lower density of the foam. The amount of microspheres generally ranges from about 0.1 parts by weight to about 50 parts by weight (based upon 100 parts of polymer mixture), more typically from about 0.5 parts by weight to about 20 parts by weight.

Alternatively or in conjunction with expandable microspheres, the PSAs of the invention may be formed into a foam by use of blowing agents, including chemical blowing agents and physical blowing agents. Use of blowing agents instead of expandable microspheres to form a foam tends to make the resulting foam more susceptible to irreversible collapse under pressure. The collapsing feature may be desirable in some applications where conformity to irregular surfaces is desired.

Physical blowing agents useful in the present invention include various naturally occurring atmospheric materials that are a vapor at the temperature and pressure at which the foam exits the die. The physical blowing agent may be introduced into the polymeric material in a gas or liquid state, preferably in a liquid state, and may be introduced in a supercritical state. Suitable physical blowing agents include carbon dioxide, nitrogen, $SF_6$, nitrous oxide, perfluorinated fluids, such as $C_2F_6$, argon, helium, noble gases, such as xenon, air (nitrogen and oxygen blend), and blends of these materials.

Chemical blowing agents may also be added to the melt mixture. Suitable chemical blowing agents include a blend of sodium bicarbonate and citric acid, dinitrosopentamethylenetetramine, p-toluenesulfonyl hydrazide, 4–4'-oxybis(benzenesulfonyl hydrazide, azodicarbonamide (1,1'-azobisformamide), p-toluenesulfonyl semicarbazide, 5-phenyltetrazole, 5-phenyltetrazole analogues, diisopropylhydrazodicarboxylate, 5-phenyl-3,6-dihydro-1,3,4-oxadiazin-2-one, and sodium borohydride.

The invention is also directed to at least one method of forming a foamed PSA article. The composition components are melt-mixed (optionally with additional ingredients) and generally elevated to a temperature above the activation temperature of the expandable microspheres (which have not been added at this point). After the polymeric materials are well mixed they are cooled, generally while still being mixed, until they are below the activation temperature of the microspheres. The expandable microspheres are subsequently added and then the temperature of this mixture is raised above the activation temperature of the microspheres, usually in an extrusion die.

V. Other Additional Ingredients

Additional ingredients may be added to augment properties of the PSA to make it suitable for the end-use article. These include, for example, a relatively high modulus polymer that can stiffen the article. Suitable polymers include, e.g., semi-crystalline polymers such as polyamides and polyesters, and relatively low modulus polymer compositions that can increase the flexibility of the article, e.g., plasticized polyvinyl chloride. The additional ingredients may be miscible or immiscible with the polymer composition. Immiscible polymer compositions can act to form fibrous networks to further reinforce the cohesive strength of the article when the immiscible phases are elongated under stretching forces. Examples of such structures containing fiber-like reinforcing networks are disclosed in WO 97/23577 "Blended Pressure-Sensitive Adhesives".

The PSA may contain agents that provide properties appropriate for the intended application of the article. Examples of suitable additives include tackifiers (e.g., rosin esters, terpenes, phenols, and aliphatic, aromatic, or mixtures of aliphatic and aromatic synthetic hydrocarbon resins), plasticizers, oils, pigments, dyes, non-expandable polymeric or glass microspheres, reinforcing agents, hydrophobic or hydrophilic silica, calcium carbonate, toughening agents, fire retardants, antioxidants, finely ground polymeric particles such as polyester, nylon, or polypropylene, stabilizers, and combinations thereof. These additives are included in amounts sufficient to obtain the desired end properties.

VI. Pressure Sensitive Adhesive Articles

The invention also features articles that include the above-described PSA composition including multi-layer articles in which the PSA composition is provided on at least one major surface of a first substrate, or sandwiched between a pair of substrates. Examples of suitable substrates include wood substrates, synthetic polymer substrates, metal substrates (e.g., metal foils), and release liners.

Additional multilayer compositions can be obtained by affixing layers of other materials to the PSA adhesive. The method of affixing may be co-extrusion, extrusion coating or lamination, for example. One or more extrudable polymer compositions may be used when melt processing techniques are employed. The number and type of polymer compositions are selected based upon the desired properties of the final article. For example, polymer compositions prepared by co-extrusion include relatively high modulus polymer compositions for stiffening the article (semi-crystalline polymers such as polyamides and polyesters), relatively low modulus polymer compositions for increasing the flexibility of the article (e.g., plasticized polyvinyl chloride), and additional foam compositions. Alternatively, non-polymeric materials may also be affixed to the composition. Non-polymeric materials include cloth, nonwovens, and foils.

The PSA compositions of the present invention may be coated by any of a variety of conventional coating techniques such as roll coating, spray coating, curtain coating, and the like. The PSA compositions may also be coated without modification by extrusion coating, coextrusion, hot-melt coating and the like by employing suitable conventional coating devices for this purpose. Primers may be used but they are not usually necessary.

The adhesive copolymer compositions prepared in accordance with the present invention can be coated upon suitable flexible or inflexible backing materials by conventional coating techniques to produce coated adhesive sheet materials in accord with the present invention. The flexible backing material may be any material conventionally utilized as a tape backing or any other flexible material. Typical examples of flexible backing materials employed as conventional tape backings which may be useful for the adhesive compositions of the present invention include those made of paper, plastic films such as polypropylene, polyethylene, polyvinyl chloride, polyester (e.g., polyethylene terephthalate), cellulose acetate and ethyl cellulose.

VII. EXAMPLES

This invention is further illustrated, without limiting the invention, by way of the following examples using the test methods described below. All parts are in parts by weight.

Dynamic Mechanical Properties

Dynamic mechanical properties were determined in the following manner. Samples were solvent cast from 40 wt % homogeneous solutions prepared using a mixture of tetrahydrofuran and chloroform solvents (1:2 wt. ratio, respectively). Casting was conducted on silicone release liners and the solvents were allowed to evaporate slowly at room temperature for 3–4 days. The cast samples were further dried in a vacuum oven for 24 hours to ensure complete solvent removal. Films having a thickness of about 1 mm were made for rheology testing by pressing the samples for 15–30 seconds between two TEFLON coated hot platens of a CARVER compression press (available from Carver, Inc.; Wabash, Ind.) maintained at 150° C. under a compressive force of about 45 kN. 25 mm diameter disks were then punched out from the resulting films and dynamic mechanical measurements conducted using an RDA II rheometer (available from Rheometrics Scientific Inc.; Piscataway, N.J.) with a 25 mm parallel plate geometry. Measurements were conducted by heating the sample from room temperature to between 170 and 200° C. at a heating rate of 5° C./min, a frequency of oscillation of 1 rad/s, and a strain amplitude of 5%. Results were displayed on a graph of elastic modulus (G') versus temperature. Sample temperature was maintained using a nitrogen convection oven.

180° Peel Strength—Film

Peel adhesion of PSA films was measured using a test similar to the method described in ASTM D 3330-90 except a glass substrate was used instead of the stainless steel substrate described in the ASTM test. Adhesive samples were cut into strips having a width of about 1.25 cm (0.5 in) and equilibrated at a constant temperature (22° C.) and humidity (50% relative humidity) for at least 24 hours. The strips were adhered to a glass substrate panel using a 2-kilogram roller that was passed once over the strip. The bonded assembly was allowed to dwell at room temperature for less than one minute. The assembly was then tested for 180° peel adhesion using either (i) an IMASS slip/peel tester (Model 3M90, commercially available from Instrumentors Inc.; Strongsville, Ohio) at a crosshead speed of approximately 30.5 centimeters/minute (12 in/min) or 228.6 cm/min (90 in/min) or (ii) an INSTRON Tensile Tester (available from INSTRON Corp. of Canton, Mass.) at variable peel rates (noted in the examples). Results were determined in ounces per 0.5 inch and converted to N/dm.

90° Peel Strength—Foam

Peel adhesion of PSA foams was measured using an INSTRON Tensile Tester. The PSA foam article was slit to a width of 1.27 cm and length of 11.4 cm and laminated to 0.127 mm thick and 1.6 cm wide aluminum foil backing using one of the major surfaces of the foam. The tape was then applied to a clean stainless steel panel using four total passes of a 2 kg (4.5 lb) hard rubber roller. The sample was aged before testing for either (1) 3 days at room temperature (22° C.) and 50% relative humidity or (2) 3 days at 70° C. in a convection oven. After aging and prior to any testing, the samples were equilibrated in a constant temperature (22° C.) and humidity (50% relative humidity) environment for about 3 hours. The panel was then mounted in an INSTRON Tensile Tester and the tape was pulled off at a 90° angle at a speed of 30.5 cm per minute. Results were determined in pounds per 0.5 inch, and converted to N/dm. Values that exceeded the capability of the test instrument were listed as >770 N/dm (>22.0 lb/0.5 in)

70° C. Shear Holding Power—Film

Shear holding power of PSA films was measured using a test similar to the method described in ASTM D 3654-88. Adhesive-coated strips were equilibrated at constant temperature (22° C.) and humidity (50% relative humidity) for at least 24 hours, and then cut into 1.27 cm (0.5 in) wide strips. Each strip was adhered to a stainless steel panel such that a 1.27 cm (0.5 inch) wide by 2.54 cm (1.0 in) long portion of the strip was in firm contact with the panel and one end of the strip hung free. The panel with the adhesive-coated strip attached to it was held in a rack at 70° C. in a convection oven such that the panel formed an angle of approximately 178° with the extended free end, which was tensioned by application of a force of 500 grams applied by a hanging weight. The panel was equilibrated in the oven for 10 min before the 500-gram weight was hung from the free end of the tape. The elapsed time for each tape example to separate from the test panel was recorded as the 70° C. Shear Holding Power. Unless otherwise noted, all shear failures reported herein were cohesive failures of the adhesive (residue left on the panel). If the test sample did not fail at 10,000 minutes, the test was stopped and a shear value of 10,000+ minutes was recorded.

Shear Holding Power—Foam

The shear holding power of the PSA foams was measured by the following method. A strip of foam was cut to a width of 1.27 cm and length of at least 2.54 cm and then one major surface of the adhesive foam was laminated to a backing of aluminum foil having a thickness of about 0.127 mm (5 mils) and a width of about 1.6 cm. The other major surface was adhered to a clean rigid anodized aluminum panel by passing a 2 kg (4.5 lb) hard rubber roller over the construction four times. The total contact area of the adhesive to the panel was 1.27 cm by 2.54 cm with a free end of the sample extending beyond the panel. The prepared panel was conditioned at room temperature, i.e., about 22° C., for at least 1 hour. The panel was then hung in a constant temperature and humidity environment (22° C.; 50% relative humidity) for room temperature (RT) shear testing. The sample was positioned 2 degrees from the vertical to prevent a peel mode failure. A 1000-gram weight was hung from the free end of the adhesive foam sample. The time required for failure was recorded in minutes. If no failure occurred within 10,000 minutes, the test was discontinued and results were recorded as 10,000+ minutes.

Foam Density (ASTM D792-86)

Foam samples were cut into 25.4 mm×25.4 mm specimens and weighed on a high precision balance equipped with a buoyancy force meter that measures the mass of displaced water. Buoyancy force meters suitable for such foam density measurements are available as Model AG245 from Mettler-Toledo; Greifensee, Switzerland. The volume of each sample was estimated from the measured amount of water displaced at room temperature (25° C.), assuming the density of water at 25° C. to be 1 g/cm³, using Archimedes' principle. The density of the foam was obtained by dividing the mass by the volume.

Film or Foam Thickness

Total composition thickness was measured to within ±2.5 (±0.1 mil) microns using a standard micrometer. Thickness of each skin "A" layer was calculated from measured material mass flow and equipment dimensions (e.g., volumetric flow rates and die width).

Materials Used

| Material | Description |
|---|---|
| IOA/AA/ (PS) | Isooctyl acrylate ("IOA")/Acrylic Acid ("AA")-derived copolymer grafted with a polystyrene ("PS")-reinforcing moiety, prepared according to Example 11 of U.S. Pat. No. 5,057,366, except that the weight ratio of the IOA/AA/polystyrene ("C-2") monomers used was 92/4/4 and the inherent viscosity (I.V.) of the resulting polymer was 0.65. |
| IOA/(PS) A | IOA-derived polymer grafted with a polystyrene ("PS") reinforcing moiety, prepared according to Example 11 of U.S. Pat. No. 5,057,366, except that AA was not used and the weight ratio of the IOA/polystyrene ("C-2") monomers used was 90/10 and the inherent viscosity (I.V.) of the resulting polymer was 0.61. |
| IOA/(PS) B | IOA-derived polymer grafted with a polystyrene reinforcing moiety, prepared according to Example 11 of U.S. Pat. No. 5,057,366, except that AA was not used and the weight ratio of the IOA/polystyrene ("C-2") monomers used was 95/5 and the inherent viscosity (I.V.) of the resulting polymer was 0.61. |
| PPO | A polyphenylene ether ("PPO"), Poly(2,6-dimethyl-1,4-phenylene ether), available as SA120-100 (from GE Plastics; Pittsfield, Maryland) with an IV = 0.12 dl/g, $T_g$ = 160° C., and $M_w$ = 6300 g/mol. |

Examples 1–5 and Comparative Example 1

Examples 1–5 illustrate the effect of PPO on the dynamic mechanical properties of PSA materials.

Example 1 was made by placing IOA/AA/(PS), PPO, tetrahydrofuran, and chloroform into a glass jar in a ratio of 98:2:50:100 (parts by weight). The contents were tumbled overnight to obtain a homogeneous solution. Rheology samples were prepared as described under the "Dynamic Mechanical Properties" section.

Example 2–5 were made using the methods and materials of Example 1 except the ratio in parts IOA/AA/(PS) to PPO was 96:4, 94:6, 92:8 and 90:10, respectively.

Comparative Example 1 was made using the methods and materials of Example 1 except the ratio in parts IOA/AA/ (PS) to PPO was 100:0.

Example 1–5 and Comparative Example 1 were tested for dynamic mechanical properties.

FIG. 1 displays the temperature dependence of the elastic modulus (G') for samples having increasing concentrations of PPO. As the amount of PPO increased, the onset of the flow region was shifted to higher temperatures. As an illustration, Examples 3–5 were still in their rubbery plateau region at 110° C. while Comparative Example 1 was already starting to flow. Thus the maximum possible use temperature was increased with compositions of the invention as compared with composition of Comparative Example 1.

Example 6–10 and Comparative Example 2

Examples 6–10 illustrate the effect of the compositions of the invention on the properties of pressure-sensitive tapes having different thicknesses.

Example 6–10 were made as Example 1–5, respectively, except the solutions were knife coated onto polyethylene terephthalate film having a thickness of about 50 μm (2 mil) and were dried for 10 minutes in a flowing air oven maintained at 65° C. The final thickness of the adhesive composition was either 44 μm (1.75 mil) or 56 μm (2.2 mil).

Comparative Example (CE) 2 was made using the methods and materials of Example 6 except the ratio in parts of IOA/AA/(PS) to PPO was 100:0.

Example 6–10 and Comparative Example 2 were tested for thickness, 180° peel strength at two different peel rates and 70° C. shear holding power. Results are shown in Table 1.

TABLE 1

| | | | 180° Peel N/dm (oz/0.5 in) | | |
|---|---|---|---|---|---|
| Example | PPO wt % | Thickness μm | Peel Rate 30.5 cm/min | Peel Rate 229 cm/min | 70° C. Shear (min) |
| CE2A | 0 | 44 | 55 (25.0) | 77 (35.0) | 41 |
| 6A | 2 | 44 | 42 (19.4) | 58 (26.5) | 687 |
| 7A | 4 | 44 | 42 (19.2) | 67 (30.8) | 10,000+ |
| 8A | 6 | 44 | 38 (17.2) | 57 (25.9) | 10,000+ |
| 9A | 8 | 44 | 29 (13.4) | 50 (23.0) | 10,000+ |
| 10A | 10 | 44 | 31 (14.2) | 54 (24.8) | 10,000+ |
| CE2B | 0 | 56 | 66 (30.2) | 82 (37.6) | 26 |
| 6B | 2 | 56 | 64 (29.4) | 89 (40.8) | 261 |
| 7B | 4 | 56 | 61 (28.0) | 83 (37.9) | 2000 |
| 8B | 6 | 56 | 66 (30.0) | 72 (32.7) | 10,000+ |
| 9B | 8 | 56 | 57 (26.0) | 73 (33.2) | 10,000+ |
| 10B | 10 | 56 | 53 (24.1) | 71 (32.2) | 10,000+ |

As seen in Table 1, 70° C. shear performance was significantly increased when PPO was present in concentrations at or above 2 weight percent.

Examples 11–15 and Comparative Example 3

Examples 11–15 illustrate the effect on the pressure-sensitive tape properties of making the compositions of the invention without the use of any solvent.

In Example 11, IOA/AA/(PS) and PPO in a ratio of 98:2 parts by weight were prepared by melt mixing in a BRABENDER mixer (available from C. W. Brabender Instruments, Inc.; South Hackensack, N.J.) having a volume of 350 cm⁻³. IOA/AA/(PS) was first molten in the BRABENDER and PPO added slowly to obtain a homogeneous mixture. A total mixture weight of 270 grams was placed in the bowl and mixed at 50 RPM at a maximum temperature of 195° C. for 15 minutes. The homogeneous mixture was then allowed to cool to room temperature under ambient conditions, causing it to solidify. The solidified mixture was cut into approximately 12.5 mm by 12.5 mm by 50 mm (½ in. by ½ in. by 2 in.) strips.

The strips were fed into a single screw HAAKE extruder (19 mm diameter L/D=25:1, available from Thermo Haake, Madison, Wis.) having 3 zones. Zone 1 was kept unheated, while Zones 2 and 3 were maintained at about 200° C. The mixture was passed through a 12.7 cm wide die also maintained at 200° C. and cast onto a polyethylene terephthalate film having a thickness of about 51 μm that passed over a casting roll maintained at a temperature of about 10° C. Adhesive film thickness was about 50 μm in all cases.

Examples 12–15 were made using the methods and materials of Example 11 except the ratio in parts IOA/AA/(PS) to PPO was 96:4, 94:6, 92:8 and 90:10, respectively.

Comparative Example 3 was made using the methods and materials of Example 11 except the ratio in parts IOA/AA/ (PS) to PPO was 100:0.

Examples 11–15 and Comparative Example 3 were tested for thickness, 180° peel strength at two different peel rates and 70° C. shear holding power. Results are shown in Table 2.

TABLE 2

| Example | PPO wt % | Thickness μm | 180° Peel N/dm (oz/0.5 in) 30.5 cm/min | 180° Peel N/dm (oz/0.5 in) 229 cm/min | 70° C. Shear (min) |
|---|---|---|---|---|---|
| CE3 | 0 | 50 | 52 (23.6) | 68 (31.1) | 26 |
| 11 | 2 | 50 | 45 (20.4) | 62 (28.2) | 60 |
| 12 | 4 | 50 | 46 (20.8) | 62 (28.2) | 169 |
| 13 | 6 | 50 | 44 (20.2) | 58 (26.6) | 432 |
| 14 | 8 | 50 | 41 (18.6) | 52 (23.5) | 360 |
| 15 | 10 | 50 | 43 (19.7) | 48 (21.7) | 1601 |

As seen in Table 2, high temperature shear performance was significantly increased when PPO was present in concentrations at or above 2 weight percent.

Examples 16–18 and Comparative Examples 4–5

Examples 16–18 illustrate the effect of the compositions of the invention on the properties of pressure-sensitive foams prepared by a hot melt process.

Example 16 was made using a two step process. The first step was a process used to mix the components comprising the "A" layer material, which was used in a subsequent process to generate a coextruded "ABA" foam construction. An IOA/AA/(PS) graft or pendant copolymer was fed into a single screw extruder (51 mm, Model 2 inch WPKR, available from Bonnot Co.; Green, Ohio) equipped with a gear pump (Zenith PEP-II, 5 cm³/rev, available from Parker Hannifin Corp.; Sanford, N.C.) driven by a 3 horsepower direct current motor, and further equipped with a heated connecting hose. The temperature of the single screw extruder and hose were maintained at about 177° C. (350° F.). The IOA/AA/(PS) was fed from the single screw extruder through the connecting hose into zone 1 of a twin screw extruder (40 mm, Model ZE, L/D=40:1, 11 zones, and available from Berstorff; Florence, Ky.) at a rate of about 6.8 kg/hr (15 lb/hr). The twin-screw extruder was operated at a screw speed of 300 RPM. A decreasing temperature profile was used, with the zones of the twin-screw extruder at 25° C. for zone 1, at 200° C. for zones 2–4, at 180° C. for zone 5, at 140° C. for zone 6, at 110° C. for zone 7, and at 100° C. for zones 8–11. Polyphenylene ether (PPO) was also fed into zone 1 of the twin-screw extruder using a gravimetric feeder (Model T-20 available from K-Tron; Pitman, N.J.) operating at about 0.55 kg/hr (1.2 lb/hr). The screw contained multiple kneading and conveying elements to adequately compound the formulation components. The compounded materials were then fed into a gear pump (10.3 cm³/rev available as NORMAG MSDA from Dynisco, Hickory, N.C.) at the exit of the twin screw extruder and transported through a stainless steel transfer pipe (19 mm OD) to the middle port of a three layer feedblock (Model 96 1501, available from Cloeren; Orange, Tex.) and subsequently into a single layer die (Ultraflex 40, width of 254 mm (10 in) available from EDI, Chippewa Falls, Wis.). The temperature of the piping, feedblock, and die was maintained at 149° C., 160° C., and 177° C., respectively. The materials were collected into silicone-lined boxes and stored until needed.

A three layer ABA construction comprising unfoamed outer "A" layers sandwiching a middle foamed "B" layer was then made as follows. The material comprising the B layer, IOA/AA/(PS) graft or pendant copolymer with PPO, was made in the same manner as the A Layer, above, except encapsulated microspheres (EMS) (available as F100D EMS from Pierce-Stevens Inc, Buffalo, N.Y.) were added at about 135 g/hr (0.3 lb/hr) to the twin screw extruder in zone 8 with a gravimetric feeder (Model T-20) and the PPO weight percent was 7.4. The material containing EMS was passed through the "B" port of the three-layer feedblock at a flow rate of about 7.3 kg/hr (16.2 lb/hr). The temperature of the feedblock was maintained at about 177° C. (350° F.).

The compounded A layer material was fed into a single screw extruder (51 mm, Model 2 inch WPKR, available from Bonnot Co.), and metered into the "A" ports of the three layer feedblock through stainless steel piping (with outside diameter of about 13 mm (0.5 in) using a gear pump (Zenith Model PEP-II, 5 cm³/rev, available from Parker Hannifin Corp.; Sanford, N.C.). The single screw extruder and tubing were maintained at a temperature of about 177° C. (350° F.).

The "A" layer material and the "B" layer material were combined into an ABA construction in the three-layer feedblock and passed through a single layer die, having a die gap of 152 μm and coated onto a chilled cast roll maintained at 10C and subsequently laminated to a silicone-coated polyethylene release liner. The speed of the cast roll, was controlled to result in a total ABA thickness of about 1.1 mm (45 mils) where each "A" layer had a thickness calculated to be about 0.13 mm (5 mil).

Example 17 was made using the methods and materials of Example 16 except no "A" layers were present and the IOA/AA/(PS) and PPO were in a ratio of 92.6:7.4 parts by weight, and the material containing EMS was passed through the "B" port of the three-layer feedblock at a flow rate of about 7.3 kg/hr. Cast roll speed was adjusted to result in a total thickness of about 1.1 mm (45 mils).

Example 18 was made using the methods and materials of Example 16 except no "A" layers were present and the IOA/AA/(PS) and PPO were in a ratio of 89.3:10.7 parts by weight, the PPO feed rate was about 0.82 kg/hr (1.8 lb/hr), and the material containing EMS was passed through the "B" port of the three-layer feedblock at a flow rate of about 7.6 kg/hr. Cast roll speed was adjusted to result in a total thickness of about 1.1 mm (45 mils).

Comparative Examples 4 and 5 were made using the methods and materials of Example 16 and Example 17, respectively, except the ratio of IOA/AA/(PS) to PPO was 100:0 parts by weight, the material containing EMS was passed through the "B" port of the three-layer feedblock at a flow rate of about 6.8 kg/h. For CE 4, which had "A" layers, the single screw extruder and tubing was maintained at a temperature of about 177° C. (350° F.). For CE 4 and CE5, cast roll speed was adjusted to result in a total thickness of about 1.1 mm (45 mils). Examples 16–18 and Comparative Examples 4–5 were measured for thickness, density, 90° peel strength for room temperature (RT) and 70° C. aged samples, and room temperature shear holding power. Results are shown in Table 3.

TABLE 3

| Example | Layers | PPO wt % | Thickness mm | Density g/cm$^3$ | 90° Peel N/dm (lb/in) (30.5 cm/min Peel Rate) | | RT Shear (min) |
|---|---|---|---|---|---|---|---|
| | | | | | 3 day RT dwell | 3 day 70° C. dwell | |
| CE4 | ABA | 0 | 1.1 | 0.730 | >770 (>44.0) | 580 (33.1) | 487 |
| 16 | ABA | 7.4 | 1.1 | 0.768 | 298 (17.0) | 298 (17.0) | 3221 |
| CE5 | B | 0 | 1.1 | 0.675 | 508 (29.0) | 335 (19.1) | 469 |
| 17 | B | 7.4 | 1.1 | 0.686 | 182 (10.4) | 170 (9.7) | 1594 |
| 18 | B | 10.7 | 1.1 | 0.689 | 170 (9.7) | 208 (11.9) | 3202 |

As seen in Table 3, shear performance was significantly increased when PPO was present.

Example 19–22 and Comparative Example 6

Examples 19–22 illustrate the pressure-sensitive properties of the compositions of the invention in which the acrylate copolymers do not contain polar monomer segments in the backbone.

Example 19 was made by placing IOA/(PS) A, PPO, tetrahydrofuran, and chloroform in a glass jar in a ratio of 95.24:4.76:50:100 in parts by weight. This resulted in a ratio in parts by weight of PPO/PS of 0.5. The contents were tumbled overnight to obtain a homogeneous solution. The solution was knife-coated onto polyethylene terephthalate film having a thickness of about 50 μm (2 mil) and dried for 10 minutes in a flowing air oven maintained at 65° C. The final thickness of the adhesive composition was about 38 μm (1.5 mil).

Examples 20–22 were made using the methods and materials of Example 19 except the ratio in parts by weight IOA/(PS) A to PPO was 90.92:9.08, 86.96:13.04 and 83.36:16.64, respectively. This resulted in a ratio in parts by weight of PPO/PS for Examples 20–22 of 1.0, 1.5 and 2.0, respectively.

Comparative Example 6 was made as Example 19 except the ratio in parts of IOA/(PS) A to PPO was 100:0.

Example 19–22 and Comparative Example 6 were tested for 180° peel strength and 70° C. shear. Results are shown in Table 4.

TABLE 4

| Example | PPO wt % | PPO/PS ratio | Thickness μm | 180° Peel N/dm (oz/in) (30.5 cm/min Peel Rate) | 70° C. Shear min |
|---|---|---|---|---|---|
| CE6 | 0.00 | 0 | 38 | 15 (13.3) | 39 |
| 19 | 4.76 | 0.5 | 38 | 22 (20.1) | 10,000+ |
| 20 | 9.08 | 1.0 | 38 | 32 (29.3) | 10,000+ |
| 21 | 13.04 | 1.5 | 38 | 41 (37.6) | 10,000+ |
| 22 | 16.64 | 2.0 | 38 | 47 (43.3) | 10,000+ |

As seen in Table 4, 70° C. shear performance was substantially increased when PPO was present. In addition, surprisingly, the peel strength increased substantially as levels of PPO increased.

Example 23–26 and Comparative Example 7

Examples 23–26 illustrate the effect of peel rate on the peel adhesion properties of the compositions of the invention in which the acrylate copolymers do not contain polar monomer segments in the backbone.

Examples 23–26 were made using the methods and materials of Examples 19–22, respectively, except the thickness of the adhesive composition was about 28 μm (1.1 mil) for each example.

Comparative Example 7 was made using the methods and materials of Example 23 except the ratio of IOA/(PS) A to PPO was 100:0 in parts by weight.

Example 23–26 and Comparative Example 7 were tested for 180° peel strength at different peel rates. Results are shown in Table 5.

TABLE 5

| Example | PPO wt % | PPO/PS ratio | Thickness μm | Peel Rate cm/min | 180° Peel N/dm (oz/in) |
|---|---|---|---|---|---|
| CE7A | 0.00 | 0 | 28 | 25.4 | 6 (5.5) |
| 23A | 4.76 | 0.5 | 28 | 25.4 | 9 (8.2) |
| 24A | 9.08 | 1.0 | 28 | 25.4 | 13 (12.1) |
| 25A | 13.04 | 1.5 | 28 | 25.4 | 16 (14.2) |
| 26A | 16.64 | 2.0 | 28 | 25.4 | 27 (24.3) |
| CE7B | 0.00 | 0 | 28 | 40.4 | 19 (17.7) |
| 23B | 4.76 | 0.5 | 28 | 40.4 | 20 (18.4) |
| 24B | 9.08 | 1.0 | 28 | 40.4 | 32 (29.4) |
| 25B | 13.04 | 1.5 | 28 | 40.4 | 36 (32.5) |
| 26B | 16.64 | 2.0 | 28 | 40.4 | 44 (39.9) |
| CE7C | 0.00 | 0 | 28 | 64.0 | 36 (33.0) |
| 23C | 4.76 | 0.5 | 28 | 64.0 | 33 (29.8) |
| 24C | 9.08 | 1.0 | 28 | 64.0 | 47 (42.8) |
| 25C | 13.04 | 1.5 | 28 | 64.0 | 48 (43.5) |
| 26C | 16.64 | 2.0 | 28 | 64.0 | 55 (50.3) |
| CE7D | 0.00 | 0 | 28 | 101.6 | 52 (47.1) |
| 23D | 4.76 | 0.5 | 28 | 101.6 | 47 (42.9) |
| 24D | 9.08 | 1.0 | 28 | 101.6 | 58 (52.8) |
| 25D | 13.04 | 1.5 | 28 | 101.6 | 59 (53.7) |
| 26D | 16.64 | 2.0 | 28 | 101.6 | 56 (50.9) |

Figure 2:
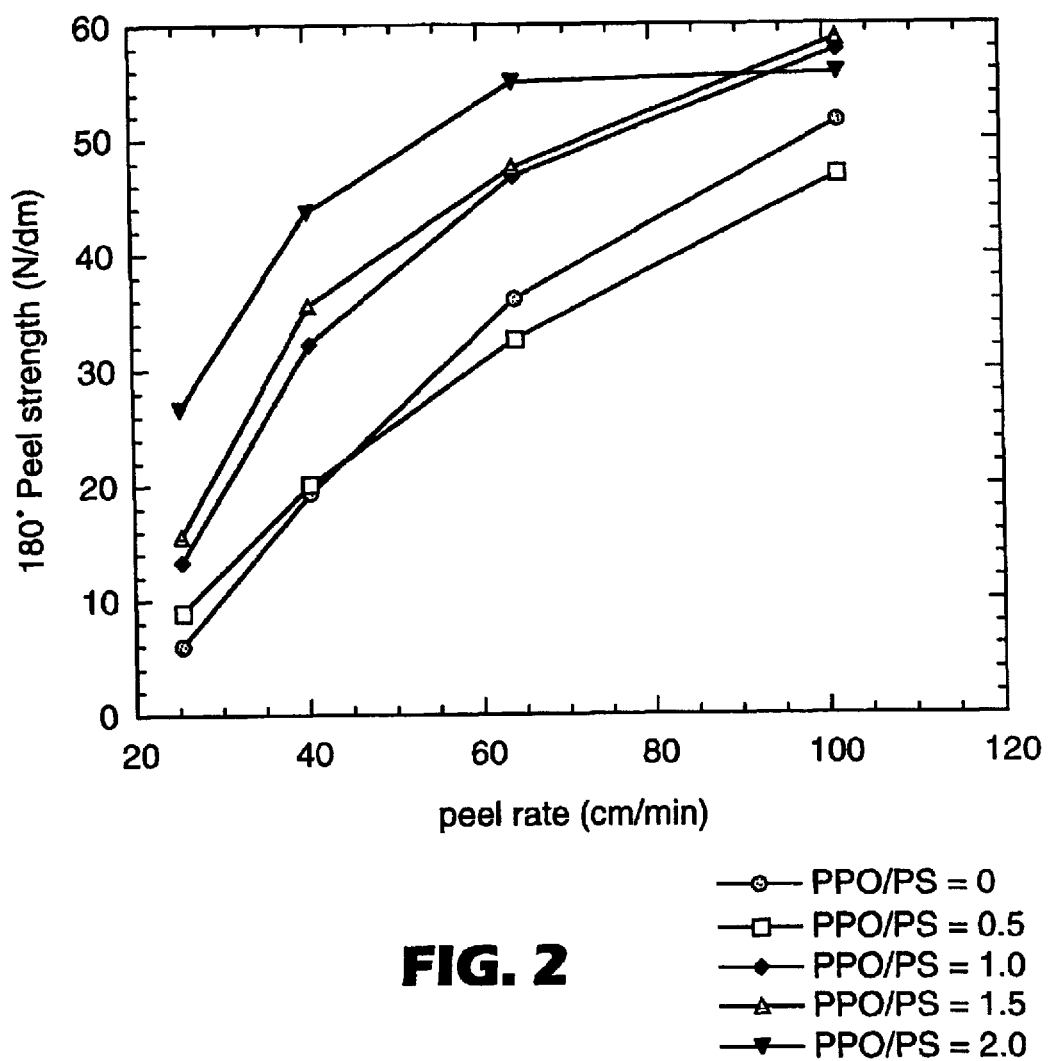
FIG. 2 is an illustration of the peel force against a glass surface vs. peel rate for compositions having a 90:10 ratio of acrylate to styrene, a constant thickness of 28 μm and varying concentrations of PPO.

As seen in Table 5, at a given peel rate, surprisingly the peel strengths generally increased as levels of PPO increased. This effect seems to be especially pronounced at lower peel rates. The peel strength vs. peel rate data is graphically shown in FIG. 2, a graph of peel strength against a glass surface vs. peel rate for compositions having a 90:10 ratio of acrylate to styrene, a thickness of 28 μm, and varying concentrations of PPO.

Example 27–30 and Comparative Example 8

Examples 27–30 illustrate the effect on pressure-sensitive properties of various weight ratios of acrylate to styrene in the copolymer compositions of the invention in which the acrylate copolymers do not contain polar monomer segments in the backbone. Examples 27–30 were made in a manner similar to Examples 19–22, respectively, except a different styrene-grafted acrylate was used and the weight ratio of materials was slightly different so that the ratio of PPO to PS varied in a similar manner to examples 19–22. The styrene-grafted acrylate was IOA/(PS) B having a weight ratio of IOA to styrene of 95:5. The ratio in parts by weight IOA/(PS) B to PPO for Examples 27–30 was 97.56:2.44, 95.24:4.76, 93.04:6.96 and 90.92:9.08, respectively. This resulted in a ratio in parts by weight of PPO/PS for Examples 27–30 of 0.5, 1.0, 1.5 and 2.0, respectively.

Comparative Example 8 was made using the methods and materials of Example 27 except that the ratio in parts of IOA/(PS) B to PPO was 100:0.

Example 27–30 and Comparative Example 8 were tested for thickness, 180° peel strength and 70° C. shear. Results are shown in Table 6.

TABLE 6

| Example | PPO wt % | PPO/PS ratio | Thickness μm | 180° Peel N/dm (oz/in) (30.5 cm/ min Peel Rate) | 70° C. Shear min |
|---|---|---|---|---|---|
| CE8 | 0.00 | 0 | 38 | 29 (26.3) | 12 |
| 27 | 2.44 | 0.5 | 38 | 35 (31.9) | 10,000+ |
| 28 | 4.76 | 1.0 | 38 | 39 (36.0) | 10,000+ |
| 29 | 6.96 | 1.5 | 38 | 47 (43.3) | 10,000+ |
| 30 | 9.08 | 2.0 | 38 | 49 (44.9) | 10,000+ |

As seen in Table 6, 70° C. shear performance was substantially increased when PPO was present. In addition, surprisingly, the peel strength also increased substantially as levels of PPO increased.

Example 31–34 and Comparative Example 9

Examples 31–34 illustrate the effect of different ratios of acrylate to styrene and peel rate on the peel adhesion properties of the compositions of the invention in which the acrylate copolymers do not contain polar monomer segments in the backbone.

Examples 31–34 were made using the methods and materials of Examples 27–30, respectively, except the thickness of the adhesive composition was about 28 μm (1.1 mil) for each example.

Comparative Example 9 was made using the methods and materials of Example 31 except the ratio in parts IOA/(PS) B to PPO was 100:0.

Example 31–34 and Comparative Example 9 were tested for 180° peel strength at different peel rates using test method for films described before. Results are shown in Table 7.

TABLE 7

| Example | PPO wt % | PPO/PS ratio | Thickness μm | Peel Rate cm/min | 180° Peel N/dm (oz/in) |
|---|---|---|---|---|---|
| CE9A | 0.00 | 0 | 28 | 25.4 | 15 (13.9) |
| 31A | 2.44 | 0.5 | 28 | 25.4 | 18 (16.7) |
| 32A | 4.76 | 1.0 | 28 | 25.4 | 28 (25.4) |
| 33A | 6.96 | 1.5 | 28 | 25.4 | 26 (23.9) |
| 34A | 9.08 | 2.0 | 28 | 25.4 | 44 (40.1) |
| CE9B | 0.00 | 0 | 28 | 40.4 | 29 (26.8) |
| 31B | 2.44 | 0.5 | 28 | 40.4 | 36 (32.6) |
| 32B | 4.76 | 1.0 | 28 | 40.4 | 43 (38.9) |
| 33B | 6.96 | 1.5 | 28 | 40.4 | 47 (43.1) |
| 34B | 9.08 | 2.0 | 28 | 40.4 | 58 (52.7) |
| CE9C | 0.00 | 0 | 28 | 64.0 | 47 (43.1) |
| 31C | 2.44 | 0.5 | 28 | 64.0 | 53 (48.5) |
| 32C | 4.76 | 1.0 | 28 | 64.0 | 59 (53.9) |
| 33C | 6.96 | 1.5 | 28 | 64.0 | 64 (58.3) |
| 34C | 9.08 | 2.0 | 28 | 64.0 | 70 (64.2) |
| CE9D | 0.00 | 0 | 28 | 101.6 | 68 (61.9) |
| 31D | 2.44 | 0.5 | 28 | 101.6 | 66 (60.5) |
| 32D | 4.76 | 1.0 | 28 | 101.6 | 75 (68.9) |

TABLE 7-continued

| Example | PPO wt % | PPO/PS ratio | Thickness μm | Peel Rate cm/min | 180° Peel N/dm (oz/in) |
|---|---|---|---|---|---|
| 33D | 6.96 | 1.5 | 28 | 101.6 | 74 (67.6) |
| 34D | 9.08 | 2.0 | 28 | 101.6 | 76 (69.3) |

Figure 3:
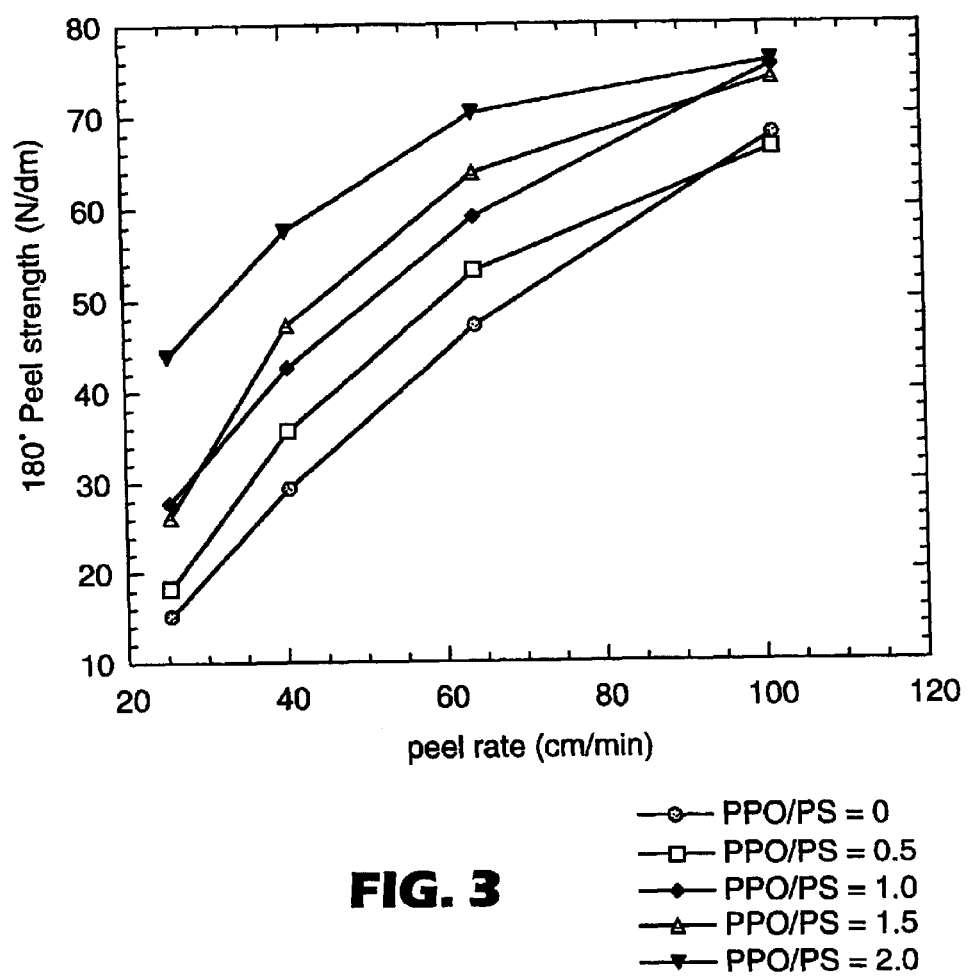
FIG. 3 is an illustration of the peel force against a glass surface vs. peel rate for compositions having a 95:5 ratio of acrylate to styrene, a constant thickness of 28 μm and a varying concentration of PPO.

As seen in Table 7, at a given peel rate, surprisingly the peels generally increased with increased levels of PPO. Additionally, at a given peel rate the overall peel strengths for a specific ratio of PPO to PS was significantly higher in the compositions of these examples, which used IOA/(PS) B, compared to the compositions based on IOA/(PS) A, which is illustrated by comparing the peel strength of Example 32A, at 28 N/dm (25.4 oz/in), with that of Example 24A, at 13 N/dm (12.1 oz/in). The above data is graphically shown in FIG. 3, a graph of peel strength against a glass surface vs. peel rate for compositions having a 95:5 ratio of acrylate to styrene, a constant thickness of 28 μm, and varying concentrations of PPO.

The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

We claim:

1. A pressure sensitive adhesive composition, the composition comprising a polymeric mixture containing:
   a) at least one copolymer comprising:
      i) an acrylic or methacrylic acid ester of a non-tertiary alcohol, and
      ii) pendant styrenic polymeric moieties; and
   b) polyarylene oxide polymer.

2. The adhesive composition of claim 1, wherein the acrylic acid ester is formed from an alcohol having from about 1 to about 14 carbon atoms.

3. The adhesive composition of claim 2, wherein the acrylic acid ester is isooctyl acrylate or 2-ethylhexyl acrylate.

4. The adhesive composition of claim 1, wherein the acrylic acid esters are copolymerized with a polar monomer to form a polymeric backbone having styrenic polymeric moieties pendant from the polymeric backbone.

5. The adhesive composition of claim 4, wherein the polar monomer is selected from the group consisting of acrylic acid, methacrylic acid, itaconic acid, acrylamide, methacrylamide, acrylonitrile, and methacrylonitrile.

6. The adhesive composition of claim 1, wherein the pendant styrenic polymeric moieties comprise polystyrene.

7. The adhesive composition of claim 1, wherein the pendant styrenic polymeric moieties have a molecular weight in the range of about 2,000 to about 30,000.

8. The adhesive composition of claim 1, wherein the pendant styrenic polymeric moieties comprise from 1 to 30 weight percent of the total weight of said copolymer.

9. The adhesive composition of claim 1, wherein the copolymer comprises a styrenic graft copolymer.

10. The adhesive composition of claim 1, wherein the pendant styrenic polymeric moieties are formed from polymers selected from the group consisting of styrene, alphamethyl styrene, 3-methylstyrene, vinyltoluene, ethylstyrene, t-butylstyrene, isopropylstyrene, dimethylstyrene, and vinylnapthalenes, and mixtures thereof.

11. The adhesive composition of claim 1, wherein the polyarylene oxide polymer comprises polyphenylene ether or poly(2,6-dimethyl-1,4-phenylene ether).

12. The adhesive composition of claim 1, wherein the polyarylene oxide polymer has a glass transition temperature of at least 100° C.

13. The adhesive composition of claim 1, wherein the adhesive composition is a foam.

14. The adhesive composition of claim 1, further comprising one or more polymeric microspheres.

15. The adhesive composition of claim 1, further comprising a tackifier.

16. A pressure sensitive adhesive composition comprising:
   (a) copolymerized A and B monomers, wherein:
      (i) A is a monomeric acrylic or methacrylic acid ester of a non-tertiary alcohol, said alcohol having from about 1 to about 14 carbon atoms, and
      (ii) B is a monomer having the general formula X—(Y)$_n$—Z wherein:
         X is a vinyl group copolymerizable with said A monomer;
         Y is a divalent linking group; where n can be zero or 1;
         Z is a monovalent styrenic polymeric moiety having a molecular weight in the range of about 2,000 to 30,000 and being essentially unreactive under copolymerization conditions; and
   (b) at least one polyarylene oxide polymer.

17. The pressure sensitive composition of claim 16, further comprising at least one polar monomer copolymerizable with said monomeric acrylic or methacrylic acid ester.

18. The pressure sensitive composition of claim 16, wherein the monomer is selected from the group consisting of acrylic acid, methacrylic acid, itaconic acid, acrylamide, methacrylamide, acrylonitrile, methacrylonitrile, and combinations thereof.

19. The pressure sensitive adhesive composition of claim 16, wherein the polyarylene oxide polymer comprises polyphenylene ether or poly(2,6-dimethyl-1,4-phenylene ether).

20. The pressure sensitive adhesive composition of claim 16, wherein the polyarylene oxide polymer has a glass transition temperature of at least 100° C.

21. The pressure sensitive adhesive composition of claim 16, wherein the adhesive composition is foamed.

22. The pressure sensitive adhesive composition of claim 16, further comprising one or more polymeric microspheres.

23. An article comprising the pressure sensitive adhesive of claim 1.

24. The article of claim 23 wherein the pressure sensitive adhesive contains chemical crosslinks.

25. The article of claim 23 wherein the article is a multi-layer article.

26. The article of claim 23 wherein the pressure sensitive adhesive is a foam.

27. A solvent-free method of making a pressure sensitive adhesive foam article comprising:
   a) providing a polymeric composition containing
      i) at least one copolymer comprising:
         1) an acrylic or methacrylic acid ester of a non-tertiary alcohol, and
         2) pendant styrenic polymeric moieties; and
      ii) polyarylene oxide polymer;
   b) heating the polymeric composition to a temperature above its glass transition temperature without substantially degrading the polymeric components;
   c) mixing the polymeric composition;
   d) adding expandable polymeric microspheres after cooling the polymeric composition to a temperature below the activation temperature of the expandable polymeric microspheres.

28. The method of claim 27 further comprising heating the polymeric composition above the activation temperature of the expandable polymeric microspheres.

* * * * *

UNITED STATES PATENT AND TRADEMARK OFFICE
CERTIFICATE OF CORRECTION

PATENT NO. : 6,777,080 B2
DATED : August 17, 2004
INVENTOR(S) : Khandpur, Ashish K.

It is certified that error appears in the above-identified patent and that said Letters Patent is hereby corrected as shown below:

Column 5,
Line 47, before "functionalized" insert -- end --.

Signed and Sealed this

Thirtieth Day of November, 2004

JON W. DUDAS
*Director of the United States Patent and Trademark Office*